United States Patent [19]

Spruill et al.

[11] Patent Number: 4,618,483

[45] Date of Patent: Oct. 21, 1986

[54] HEAT RECOVERY THROUGH OXIDATION OF ELEMENTAL PHOSPHORUS IN A FLUIDIZED BED

[75] Inventors: Howard T. Spruill, Franklin; Thelton A. Webster, Madison, both of Tenn.

[73] Assignee: Stauffer Chemical Company, Westport, Conn.

[21] Appl. No.: 759,201

[22] Filed: Jul. 26, 1985

[51] Int. Cl.⁴ ............................................. C01B 25/12
[52] U.S. Cl. .................................................... 423/304
[58] Field of Search ........................................ 423/304

[56] References Cited

U.S. PATENT DOCUMENTS 3,982,901  9/1976  Steever et al. ..................... 423/58
4,379,131  4/1983  Daniel et al. ....................... 423/304
4,450,146  5/1984  Klepeis .............................. 423/304
4,525,329  6/1985  Kuxdorf et al. .................... 423/304

Primary Examiner—John Doll
Assistant Examiner—Wayne A. Langel
Attorney, Agent, or Firm—Robert F. Sheyka; Vivienne T. White

[57] ABSTRACT

There is disclosed a process for the recovery of the heat values produced during the combustion of phosphorus to phosphorus pentoxide. The disclosed process dries ambient air to produce dry air, and combusts elemental phosphorus in said dry air in at least one fluid bed having in intimate contact therewith steam generating means containing steam generating fluid.

10 Claims, 1 Drawing Figure

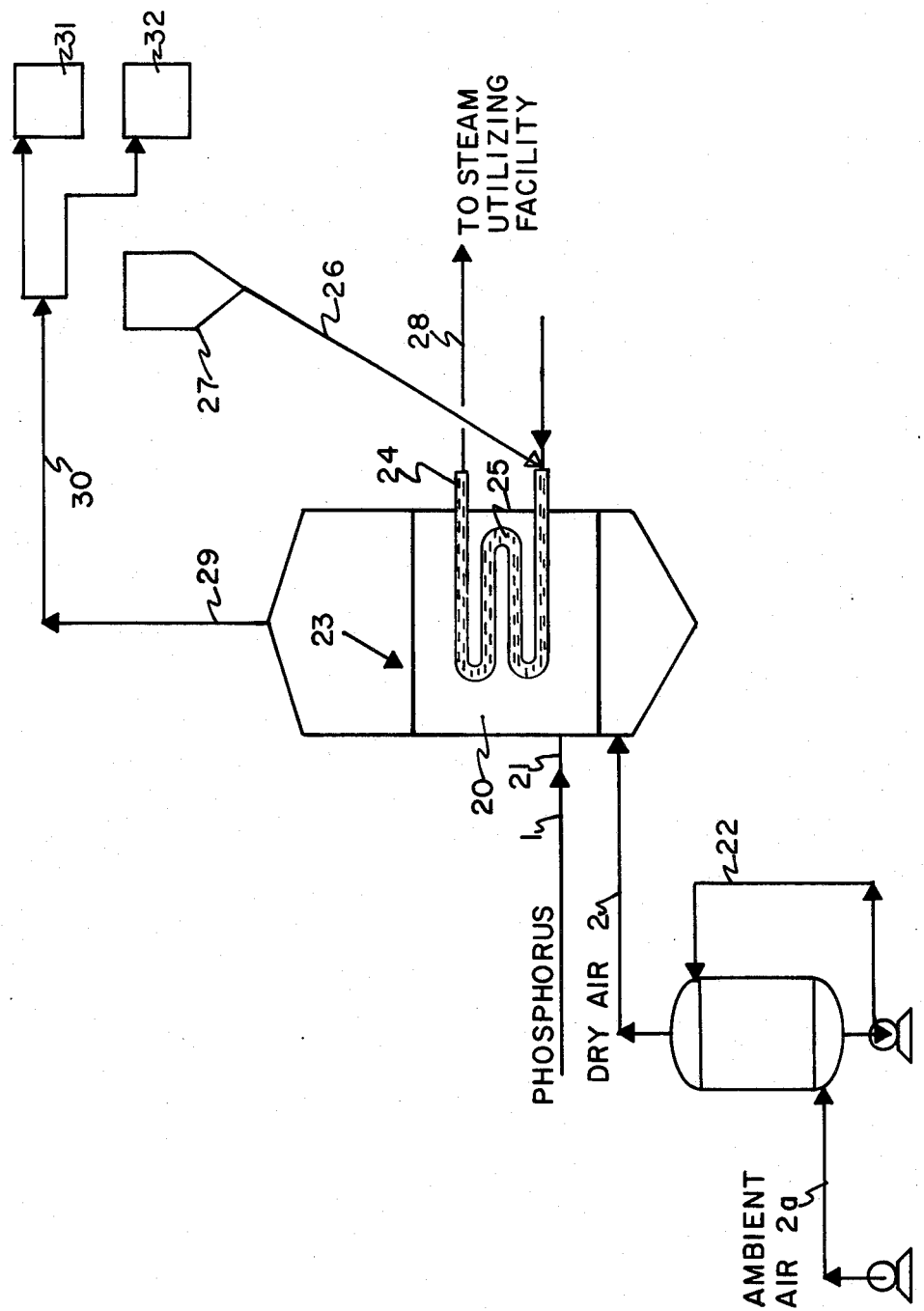

HEAT RECOVERY THROUGH OXIDATION OF ELEMENTAL PHOSPHORUS IN A FLUIDIZED BED

FIELD OF THE INVENTION

The present invention is directed to a process for the recovery of the heat values generated during the conversion of phosphorus to phosphorus pentoxide.

BACKGROUND OF THE INVENTION

The high heat of combustion of phosphorus to phosphorus pentoxide and ultimately to produce phosphoric acid equals about 10 MBTU/lb (730 KCAL/mol of $P_4$) and can be utilized in the evaporation of water from dilute phosphate solutions or phosphoric acid solutions that require concentration before subsequent processing.

In recent years, the oxidation of phosphorus to phosphorus pentoxide has taken place in stainless steel water jacketed chambers wherein the heat of combustion is dissipated by conduction to the circulating water. With the advent of these improved combustion chambers, there has been a concomitant interest in devising methods for the recovery of the waste heat values generated during the conversion of phosphorus to phosphorus pentoxide.

It has been suggested to recover low level ($<100°$ C.) heat from wet manufacturing processes by operating on the Rankine cycle. This process, however, would only recover the low level heat which amounts to $<5$ percent of the heat values produced.

Japanese Pat. No. 84,890, reported in Derwent Publication No. 60687B (1979), is said to disclose a phosphoric acid plant wherein corrosion is prohibited by predrying the combustion air to prevent the formation of corrosive polyphosphoric acids and heat transfer surfaces are operated above the dew point of $P_2O_5$. The disclosed process requires that the boiler tubes be directly exposed to the combustion gases, thereby creating the possibility of uneven heat transfer.

An article in *Chemical Week*, Jan. 31, 1979 issue, page 36, disclosed that Battelle Laboratories was utilizing Battelle's multisolid fluidized-bed combustion process to burn solids and sewage sludges. The unit is described as burning waste mixed with sand while the mixture is suspended in a vertical air stream. The hot sand is then separated and recirculated through an external boiler where it is utilized to dry the sludge and vaporize water to produce steam.

Another article in *Chemical Week*, Oct. 17, 1984, page 39, discloses that second generation fluidized-bed combustion chambers for coal can sidestep the problem of erosion and corrosion of steam-generating tubes in the fluidized bed by removing the heat-recovery zone to other places.

U.S. Pat. No. 4,450,146 discloses a process for the recovery of heat values from the oxidation of phosphorus to phosphorus pentoxide wherein the phosphorus is oxidized to $P_2O_5$ in a fluidized bed and the fluidized-bed particles are then contacted with water to produce steam. While a somewhat viable alternative, the disclosed process suffers from the disadvantage of requiring the energy-inefficient removal of the fluid bed material, and then contacting the removed material with water to produce steam. The particles must also be dried before being returned to the bed.

SUMMARY OF THE INVENTION

In accordance with the present invention, there is disclosed a process for the recovery of the heat values produced during the combustion of phosphorus to phosphorus pentoxide. In the present process, phosphorus is combusted in a fluidized bed using air which has been dried to about $-50°$ C. (dew point). Immersed within the fluidized bed are steam generating means through which a steam generating fluid is passed. The heat generated through the combustion of the phosphorus to phosphorus pentoxide passes by conduction to the fluid bed particles, and then to the steam generating means and converts the circulating fluid to steam.

BRIEF DESCRIPTION OF THE DRAWINGS

The FIGURE illustrates a flow diagram comprising an embodiment of the process of the invention.

DETAILED DESCRIPTION OF THE INVENTION

In the process of the present invention, elemental white (yellow) phosphorus is combusted (burned) to produce phosphorus pentoxide. This process can be accomplished using any suitable vessel, such as a refractory-lined combustion chamber or, with suitable adaptation, a water-cooled combustion chamber.

The elemental phosphorus to be combusted to phosphorus pentoxide can be introduced into the combustion chamber using any number of suitable means known to those skilled in the art to which this invention pertains. However, it is most preferable to introduce the elemental phosphorus to be combusted into the combustion chamber through an air atomizing nozzle. Introduction of elemental phosphorus into the combustion chamber by means of an air atomizing nozzle insures substantially complete oxidation of the elemental phosphorus and minimizes the possibility of an accumulation of elemental phosphorus with a resultant hot spot.

In the present invention, the elemental phosphorus is burned using, as an oxidizing medium, air which has been dried to a temperature of a minimum of $-50°$ C. (dew point) by passage through an appropriate drying means. Drying of the air insures that the possibility of the formation of corrosive meta and poly acids is eliminated. Dew point is, of course, the temperature of the atmosphere at which the saturation vapor pressure equals the actual (partial) vapor pressure of the water vapor in the air, and dew begins to form.

The combustion vessel into which the elemental phosphorus and oxidizing dry air are introduced may be any conventional type such as refractory-lined combustion chamber or, with suitable adaptation, a water-cooled combustion chamber. One slight disadvantage in using the suitably adapted water jacket cooled combustion chamber is that a large percentage of the heat generated during the combustion process can be lost through dissipation through the cooling system.

The combustion vessel also comprises at least one fluid bed. The fluid bed, which can comprise any inert high melting point solids such as silicon dioxide, aluminum oxide or the like, is generally maintained at temperatures of from about 400° C. to about 1250° C. The hot combustion gases ($P_2O_5$, excess $O_2$ and nitrogen) at from about 1500° C. to about 2200° C. pass through the fluid bed particles and, upon cooling, heat the fluid bed particles, to about 400° C. to 1250° C.

Intimately contacting the fluid bed particles, either within the fluid bed itself or within the wall of the combustion vessel, are steam generating means preferably comprised of steam boiler tubes or other water carrying means. Since the previously heated fluid bed particles are in intimate contact with the steam generating means, located as hereinbefore discussed, the fluid within the steam generating means is converted by conduction to steam which can be used for heating purposes or for the co-generation of electricity. The fluid within the steam generating means is preferentially water, although other water containing fluids can be used. By "water containing fluid" is meant any fluid containing from about 70 to over 80 percent water which can be used to produce steam.

The combustion gases which are comprised namely of $P_2O_5$ and nitrogen can be further processed to produce phosphoric acid, or, if desired, anhydrous phosphorus pentoxide.

The process can best be described with reference to the drawing. From the FIGURE, it can be seen that phosphorus 1, preferentially in an atomized form, is introduced into combustion vessel 20 through atomizing nozzle 21. Before being introduced into combustion vessel 20, ambient air 2a is passed through drying means 22. Drying means 22 may be any suitable drying means with one non-limiting example being a super phosphoric acid dryer. Upon passage through drying means 22, the ambient air 2a has been converted to dry air 2 at a temperature of at least −50° C. (dew point).

Combustion vessel 20 contains at least one fluid bed 23 comprised of solid particles such as sand ($SiO_2$), aluminum oxide ($Al_2O_3$) or the like. The elemental phosphorus is burned at a temperature of from about 1500° C. to about 2200° C.

The fluid bed particles are in intimate contact with steam generating means 24. Steam generating means 24 may exist in many forms including straight or coiled tubing, helical tubing or plate coils. Since the present invention uses dry air to oxidize the elemental phosphorus to phosphorus pentoxide, the possibility of formation of corrosive meta and poly acids is virtually eliminated, however, it is preferable that steam generating means 24 be comprised of a corrosion resistant material such as fabricated steel, INCONEL® nickel-chromium alloy, and other corrosion resistant materials such as 316L stainless steel.

Circulating within steam generating means 24 is fluid 25 which may be any water containing fluid generating steam upon exposure to high temperature.

Circulating fluid 25 is supplied to steam generating means 24 by means of supply line 26 leading from fluid storage means 27. Exit steam 28 from steam generating means 24 is then circulated to steam utilizing facility (not shown) wherein the generated steam can be used for heating purposes or for the co-generation of electricity.

Combustion gases 29 comprised mainly of $P_2O_5$ and nitrogen are then conveyed from combustion vessel 20 via line 30 to acid hydrator 31 or $P_2O_5$ condenser 32.

It is within the scope of the invention to use a plurality of fluid beds having steam generating means in intimate contact therewith. For instance, in the embodiment shown, heat leaving the fluid bed at a temperature of from about 1250° C. is passed through a second fluid bed having steam generating means in intimate contact therewith.

It should be obvious to one of skill in the art that the heat recovered must be about the temperature at which phosphorus pentoxide condenses.

It is expected that a minimum of about 55 to 60 percent of the waste heat values can be recovered using the process of the present invention.

Additional features of the preferred and most preferred features of the present invention are found in the claims hereinafter.

What is claimed is:

1. A process for the recovery of the heat values produced during the production of phosphorus pentoxide comprising:
   (a) passing ambient air through drying means to produce dry air; and
   (b) burning elemental phosphorus in said dry air produced in step (a) to produce hot $P_2O_5$-containing combustion gases said burning taking place in at least one fluid bed wherein said hot combustion gases transfer heat to the fluid bed particles, said fluid bed also having steam generating means containing circulating steam generating fluid within the fluid bed itself in intimate contact with said heated fluid bed particles.

2. The process of claim 1 wherein the elemental phosphorus is in the atomized state.

3. The process of claim 1 wherein the elemental phosphorus is combusted at a temperature of from about 1500° C. to about 2200° C.

4. The process of claim 1 wherein the fluid bed particles are comprised of sand.

5. The process of claim 1 wherein the fluid bed is heated to a temperature of from about 400° C. to about 1250° C. by the passage of the combustion gases through the bed.

6. The process of claim 1 wherein said steam generating means comprises steam boiler pipes immersed within said fluid bed.

7. The process of claim 1 wherein said steam generating fluid is water.

8. The process of claim 1 wherein said drying means is a super phosphoric acid absorber.

9. The process of claim 1 wherein said ambient air is dried to a temperature of a minimum of −50° C.

10. The process of claim 1 wherein said process takes place in a plurality of fluid beds.

* * * * *